United States Patent [19]

Motoyama et al.

[11] Patent Number: 5,394,544
[45] Date of Patent: Feb. 28, 1995

[54] SOFTWARE SYSTEM DEBUGGER WITH DISTINCT INTERRUPT VECTOR MAPS FOR DEBUGGING AND APPLICATION PROGRAMS

[75] Inventors: Tetsuro Motoyama; Banky Mor, both of San Jose; Gregorio Rodriquez, Union City; Chan Kim, Fremont, all of Calif.

[73] Assignees: Ricoh Co., Ltd., San Jose, Calif.; Ricoh Corporation, San Jose, Calif.

[21] Appl. No.: 98,214

[22] Filed: Jul. 26, 1993

Related U.S. Application Data

[63] Continuation of Ser. No. 668,806, Mar. 7, 1991, abandoned, which is a continuation of Ser. No. 390,610, Aug. 7, 1989, abandoned.

[51] Int. Cl.⁶ ............................................. G06F 11/00
[52] U.S. Cl. ............................. 395/575; 364/267.91; 364/945.7; 364/DIG. 1
[58] Field of Search .................... 395/575; 371/19, 17; 364/200, 900, 267.91

[56] References Cited

U.S. PATENT DOCUMENTS

| | | | |
|---|---|---|---|
| 3,551,659 | 12/1970 | Forsythe | 364/200 |
| 3,927,938 | 2/1976 | Matthews | 371/19 |
| 4,080,650 | 3/1978 | Beckett | 364/200 |
| 4,275,441 | 1/1981 | Takeuchi | 364/200 |
| 4,277,827 | 7/1981 | Carlson et al. | 364/200 |
| 4,312,066 | 1/1982 | Bantz et al. | 371/16 |
| 4,589,068 | 5/1986 | Heinen, Jr. | 364/300 |
| 4,755,997 | 7/1988 | Takhashi | 371/19 |
| 4,768,149 | 8/1988 | Konopik et al. | 364/200 |
| 4,802,165 | 1/1989 | Ream | 371/19 |
| 4,819,234 | 4/1989 | Huber | 364/200 |
| 4,881,228 | 11/1989 | Shouda | 371/19 |
| 4,901,259 | 2/1990 | Watkins | 364/578 |
| 4,924,382 | 5/1990 | Shouda | 364/200 |
| 4,953,084 | 8/1990 | Meloy et al. | 314/200 |
| 5,047,926 | 9/1991 | Kuo et al. | 364/200 |
| 5,053,949 | 10/1991 | Allison et al. | 364/200 |
| 5,115,502 | 5/1992 | Tallman | 398/800 |
| 5,121,472 | 6/1992 | Danish et al. | 395/275 |
| 5,127,103 | 6/1992 | Hill et al. | 395/575 |
| 5,132,971 | 7/1992 | Oguma et al. | 371/16.2 |
| 5,133,057 | 7/1992 | Ishii et al. | 395/378 |
| 5,134,701 | 7/1992 | Mueller | 395/500 |
| 5,165,027 | 11/1992 | Krauskopf | 395/400 |
| 5,251,150 | 10/1993 | Ladner et al. | 364/550 |
| 5,647,926 | 9/1991 | Kuo et al. | 364/200 |

OTHER PUBLICATIONS

Richard Spillman, "Computer Architecture and VAX Assembly Language Programming", pp. 536–555, 1987.

*Primary Examiner*—Thomas C. Lee
*Assistant Examiner*—Christopher B. Shin
*Attorney, Agent, or Firm*—Flehr, Hohbach, Test, Albritton & Herbert

[57] ABSTRACT

A system for debugging an application program includes a debugging execution unit operated under an operating-system-free environment. The debugging execution unit includes a communication channel, a target processor unit for executing the application program and a first debugging program, and an interrupt vector swapper. The first debugging program includes a first set of input/output procedures for handling debugging communications over the communication channel, and the application program includes a second set of input/output procedures for handling communications over the communication channel associated with execution of the application program. Interrupt signals are generated when the target processor unit receives communications from the host processor unit. The target processor unit communicates with a host processor unit via the communication channel both when executing the application program and when executing the first debugging program. A first set of interrupt vector entries link interrupt signals generated during execution of the first debugging program to a first set of destination addresses. A second set of interrupt vector entries link interrupt signals generated during execution of the application program to a second set of destination addresses. A vector controller maps interrupt signals via the first set of interrupt vector entries during execution of the first debugging program, and maps interrupt signals via the second set of interrupt vector entries during execution of the application program.

13 Claims, 12 Drawing Sheets

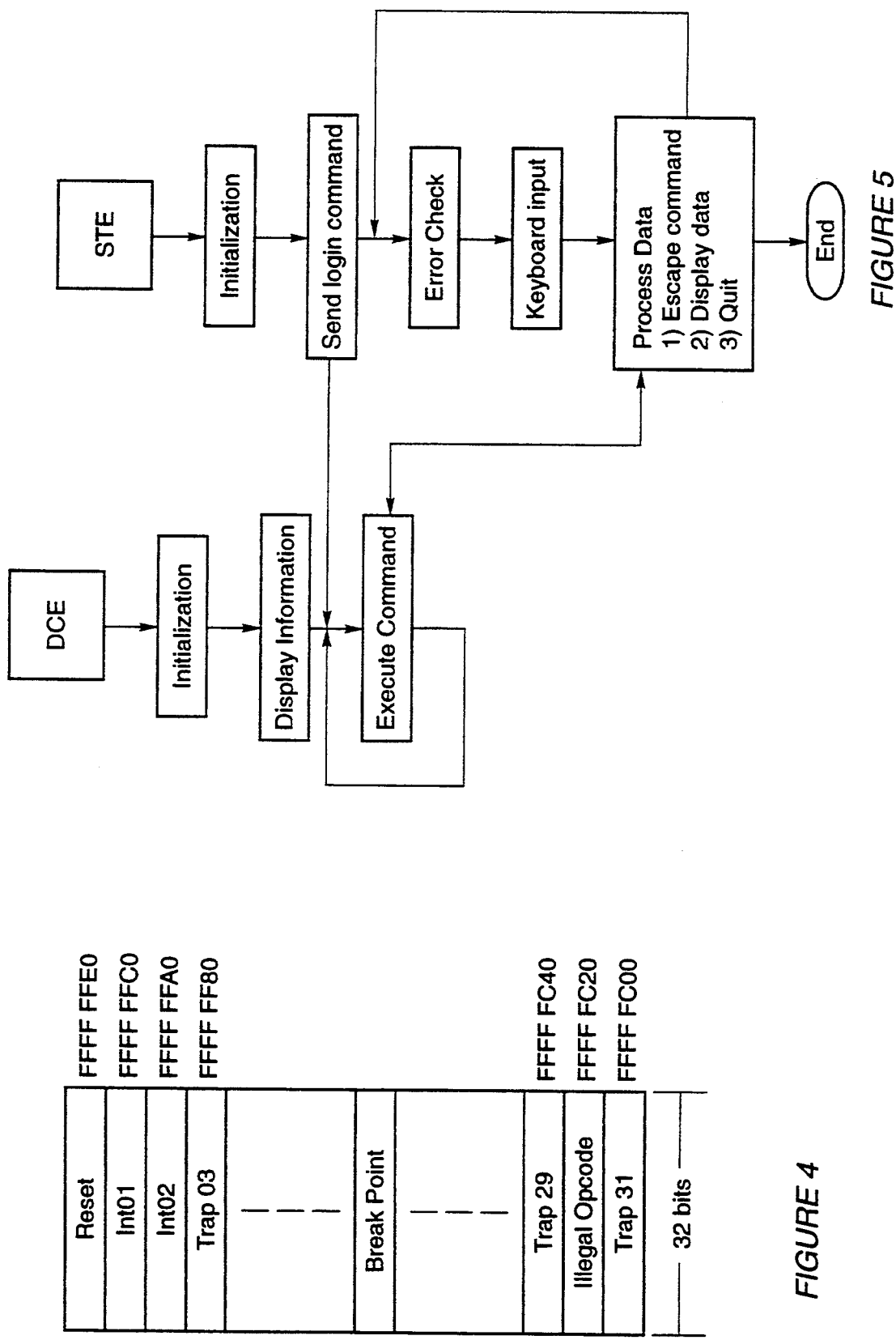

SOFTWARE SYSTEM DEBUGGER WITH DISTINCT INTERRUPT VECTOR MAPS FOR DEBUGGING AND APPLICATION PROGRAMS

This is a continuation of application Ser. No. 07/668,806, filed Mar. 7, 1991, abandoned, which is a continuation of application Ser. No. 07/390,610, filed Aug. 7, 1989, now abandoned.

BACKGROUND OF THE INVENTION

The present invention relates to a software system debugger (SSD).

In order to develop software for a particular CPU, it is important to have debugging tools to find bugs. Normally, if the software is developed for a computer with operating system, many debugging tools are available. However, with a CPU such as TMS34010 (manufactured by Texas Instruments) which is designed to be used to control peripheral devices (CRT and printer), software debugging tools are very limited. One of the reasons for this limitation is that the software must frequently be debugged on the target boards. However, because each board is different, it has been difficult to develop a general purpose debugger.

Some of the major tasks required to debug software are: downloading of the software from the development environment to the target board; executing the software (trace, single instruction, or multiple instructions); setting the breakpoints; displaying the memory contents; displaying the register contents. These tasks can be performed by an emulator such as XDS/22 from Texas Instrument for the TMS34010 chip. The major problem of using the emulator, however, is the cost. (The XDS/22 is relatively expensive.) Because of the cost, software developers tend to own a limited number of the emulators. If the number of emulators is less than the number of software engineers, some of the engineers must wait to debug their program until they can have access to the emulator. One other major problem of XDS/22 is that the size of executable code is limited to a relatively small size (e.g., 128K words). Therefore, the software exceeding 128K words can not be debugged in the straightforward way.

A similar debugging environment is available for the TMS34010 board supplied by Texas Instrument. Although the board with this capability was named as "Software Development Board", application of this debugging environment was limited because of difference between this board and the target board. For example, if the target board has 4M bytes of RAM, 1M bytes of ROM and two serial ports, the target software must be substantially modified to be able to run on the "Software Development Board." The net result is that the software debugged under "Software Development Board" must be debugged on the target board again in order to be fully operational.

In the above debugging arts, a user can not use symbols generated by the compiler and must use addresses which are rather difficult to use.

SUMMARY OF THE INVENTION

It is an object of the present invention to provide an improved software system debugger.

An advantage of this invention is that software can be debugged on a target board. Therefore, the resulting software does not need to be modified. The structure of the software isolates the hardware dependent portions so that when the target board is changed the debugging system can be easily ported to the target board. In addition, because special equipment other than a microcomputer which are relatively inexpensive, the number of the target boards rather than the number of emulators determines the number of software engineers who can debug their software. In addition, use of symbols rather than addresses allows users to perform debugging much easier and faster.

Additional objects, advantages and novel features of the present invention will be set forth in part in the description which follows and in part become apparent to those skilled in the art upon examination of the following or may be learned by practice of the invention. The objects and advantages of the invention may be realized and attained by means of the instrumentalities and combinations which are pointed out in the appended claims.

BRIEF DESCRIPTION OF THE DRAWINGS

The accompanying drawings which are incorporated in and form a part of this specification illustrate an embodiment of the present invention and, together with the description, serve to explain the principles of the invention.

FIG. 4 depicts a hardware vector table.

FIG. 5 depicts an overall software system diagram according to the present invention.

DETAILED DESCRIPTION OF THE DRAWINGS

Reference will now be made in detail to the preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

Target board 12 is the board for which a software must be developed. Software (DCE) 16 in the target board is a part of the debugging system which performs various tasks of debugging. Software (STE) 24 in microcomputer 20 is a communication software to handle communication between a user and the debugging tasks.

The following is a summary list of functions performed by the current system 10.

Batch The batch file can be created, executed or displayed with several commands in sequence.

Break Breakpoints can be set, reset or displayed.

Compute Decimal and hex decimal computation and conversion can be performed.

Help Help commands to assist users are available on line.

Memory Memory contents can be displayed, can be filled, or can be modified in bytes, words or double words.

Program Target Software to be developed can be loaded from a micro-computer (where STE is running) along with the symbol map, can be disassembled in the debugging system, and can be executed by trace, single instruction, or multiple instructions using symbols rather than addresses. In addition, execution information of the target program can be redisplayed.

Registers Contents of various registers can be displayed or modified.

Symbol Target program Symbols can be displayed along with addresses.

Miscellaneous Screen scrolling control (stop, continue, set count), printer control (print screen, send form feed), abort, reset, repeat last command, and loading data files for target programs can be performed.

Figure 1:
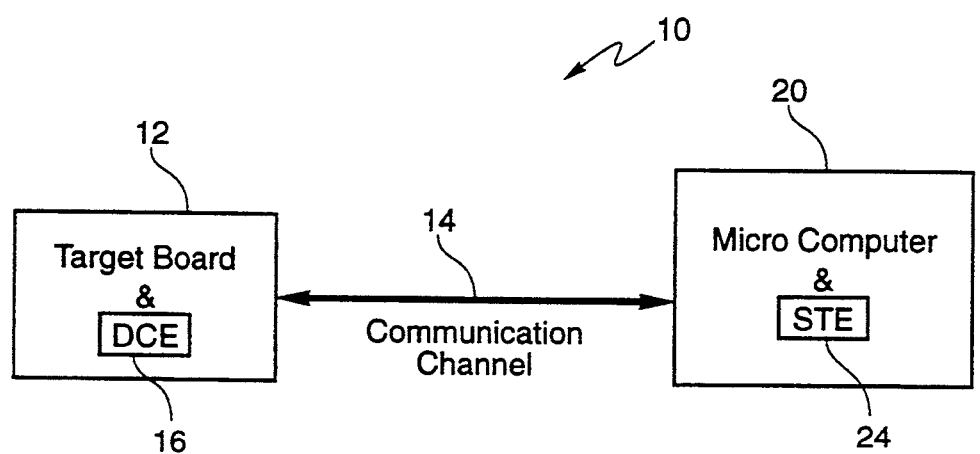
FIG. 1 depicts a configuration of a software system debugger system according to the present invention.

FIG. 1 shows the configuration of the system 10. The target board 12 is connected through a communication channel 14 to a microcomputer 20. In one preferred embodiment, communication channel 14 is RS232C, and microcomputer 20 is an IBM AT clone. However, those skilled in the art can change the communication channel and the microcomputer to meet their requirements without fundamental changes.

Figure 2:
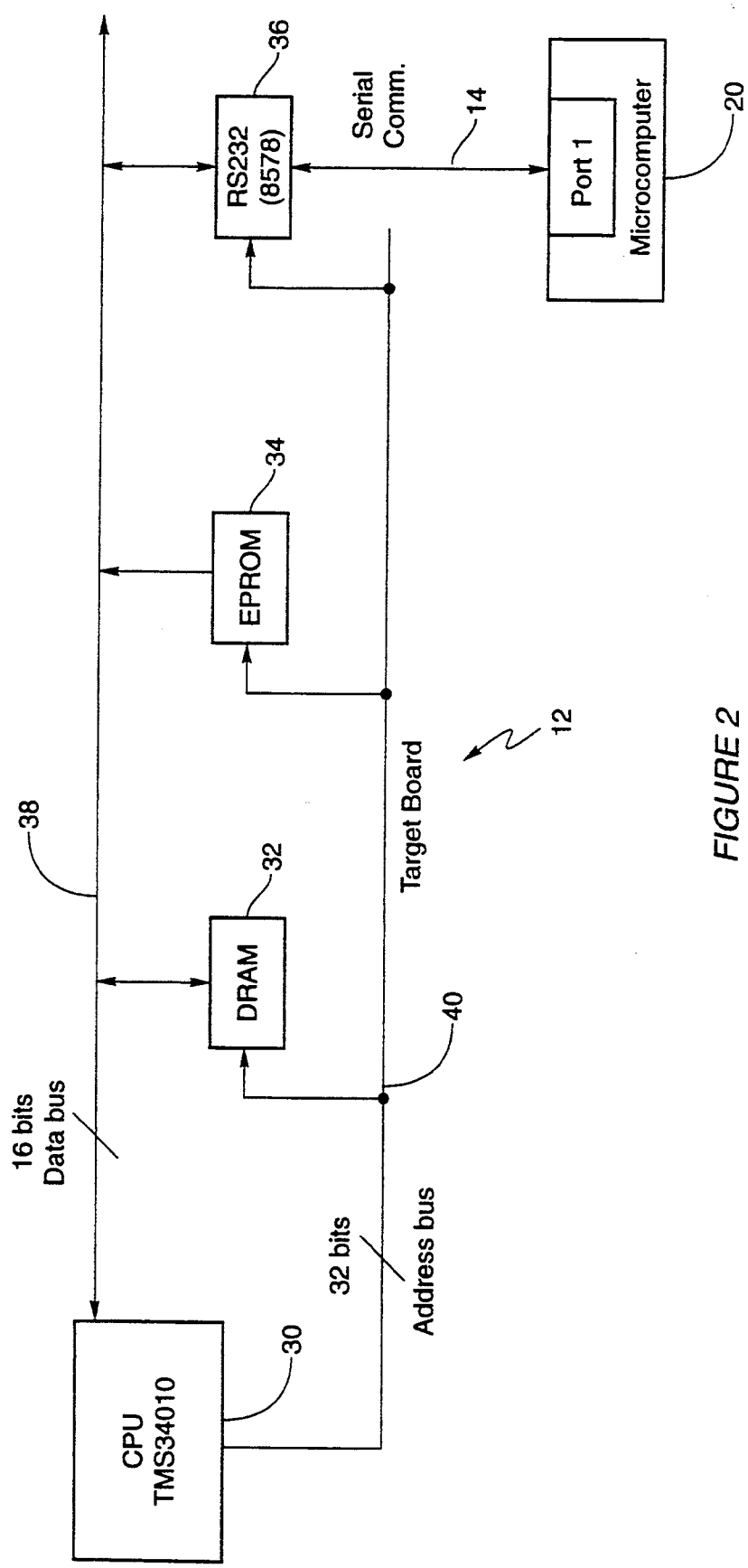
FIG. 2 depicts a block diagram of the preferred embodiment of the software debugging system according to the present invention.

FIG. 2 illustrates a block diagram of the debugging system 10. In the particular implementation, the target board is a laser printer controller (LPC) board such as manufactured by Ricoh Corporation and the microcomputer could be an AT clone.

The following software design specification contains all the information needed to design a debugger for the LPC (laser printer controller) target board with the AT clone as the host. SSD (software system debugger) is made up of two independent environments (the TMS 12 and the IBM PC 20) which communicate with each other via serial communication (RS232) 14.

This specification describes the two environments in a relative manner. Also, this specification will give a general description of the debugger structure, and will focus on those specific technical designs included in this debugger. The work is balanced between the two parts, to have the best performance according to their features.

The design and development of this debugger is to help develop software for the LPC (laser printer controller) target board 12. Although there are already some tools available, they are not adequate for one reason or another, as previously described. This debugger is customized according to the LPC architecture and the requirements for the software developed in the LPC target board. The debugger is not only designed to satisfy the LPC environment, but to save money compared to the expensive emulator (XDS/22) for the TMS34010. Also, this debugger is intended to have some special features, like downloading and displaying target symbols.

The following hardware and software is used: AT clone with the Microsoft MS-DOS version 3.3, and with at least one serial port (RS232) available, and development board (LPC) with the TMS34010 (Graphic System Processor) and a RS232 port.

In order to develop the TMS34010 debugger with the AT clone as the host, two different types of tools are used. One type is used for the TMS environment. The other is used for the AT clone. The following development tools are used:

| TMS Environment: | |
|---|---|
| IBM AT (clone) | |
| GSP COFF C Compiler | version 3.00 |
| GSP COFF Assembler | version 3.00 |
| GSP COFF Link | version 3.00 |
| Microsoft Make Utility | version 4.02 |
| XDS/22 TMS34010 Emulator | |
| IBM PC Environment: | |
| IBM AT (clone) | |
| Microsoft C Compiler | version 4.00 |
| Microsoft Macro Assembler | version 4.00 |
| Microsoft Linker | version 4.00 |
| Microsoft Make Utility | version 4.02 |
| Microsoft Code View | version 1.00 |
| Desmet Utility (PCIO) | version 3.1 |
| Other Tools Used: | |
| Logic Analyzer (L/P 1630G) | |
| EPROM Programmers (Data I/O) | |
| Asynchronous Line Monitor for the RS232 | |

In the hardware aspect, only those areas that are important for the debugger's design are discussed. These hardware aspects are only for the LPC (laser printer controller) board (TMS34010). For the host (AT clone) side, see IBM technical reference. The hardware areas for this design are the following: DRAM, EPROM, I/O (RS232) and CPU (TMS34010), as shown in FIG. 2.

In FIG. 2, the following should be kept in mind:
1) The TMS34010 is bit addressable and is going to be used as a General CPU (no graphics).
2) Data is transferred/received via serial communication. Transferring/receiving is asynchronized (interrupts).

Figure 3:
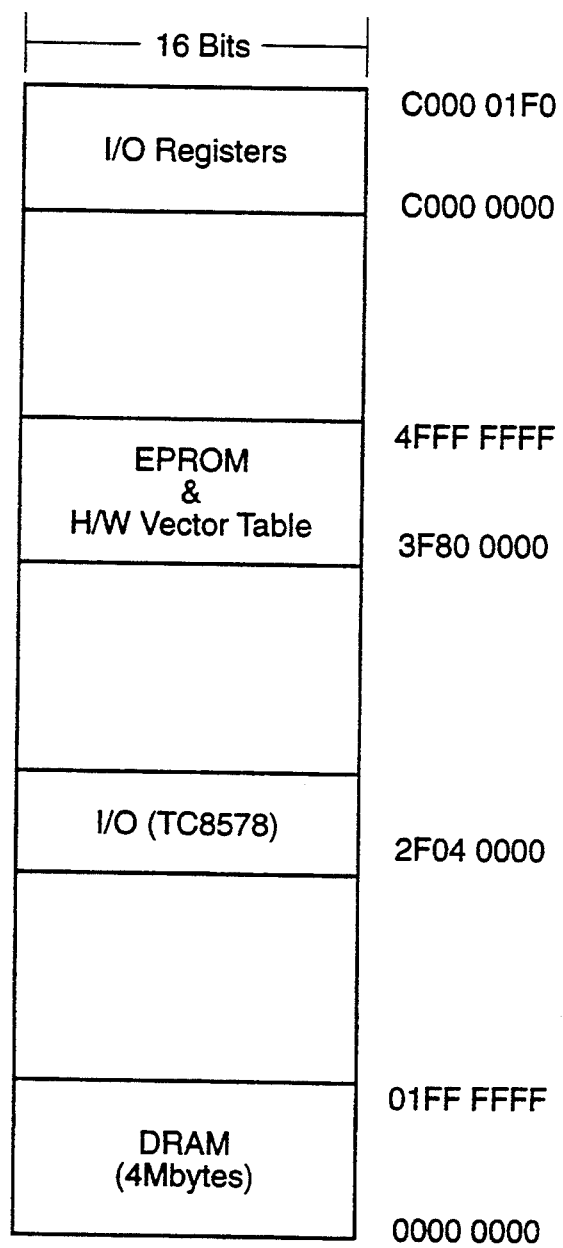
FIG. 3 depicts a memory I/O and register mapping table according to the preferred embodiment of the present invention.

FIG. 3 shows the memory, I/O, and Register Mapping Table of the present invention. In the LPC (laser printer controller) board, 4M bytes (0000 0000) to 01FF FFFF) of memory (DRAM) 32 are available. Mainly this memory is used for the debugger variables (.bss section) and to download the target software. The EPROM 34 (3FF0 0000 to 3FFF FFFF) area is used for the debugger executable code (.text section) and the hardware vector table. The I/O is handled as I/O memory ports. These I/O ports are located like memory locations (addresses). The I/O registers are defined by the TMS34010 and are also treated as memory locations.

FIG. 4 shows the hardware vector table. Reset (trap 0) and Illegal Opcode (trap 30) were not mapped to the software and burned to ROM. The following shows the process;

Interrupt→Hardware table→Service routine.

The rest are mapped to the software vector and handled by DCE. The following shows the process;

Interrupt→Hardware table→Software table→Service routine.

The reason for this indirect jump is that the target and DCE must share the same interrupt requiring the changes of service routines for the same interrupt depending upon who has the control, DCE or target software.

Hardware Vector Table (FIG. 4)

The following vectors are not mapped to the software vector table: illegal opcode (trap 30) and reset (trap 0). The rest are mapped and handled by the debugger, as seen in FIG. 4.

These are the main ideas included in this debugger design. Special care and unique design techniques are taken into great consideration. These are explained in more detail in the next section.

1. User friendly is one main goal of designing. In order to accomplish this aspect, symbolic and windowing capabilities are taken into account.

2. Since the debugger SSD (software system debugger) is made of two different environments, a special care of the synchronization problem between two CPUs the LPC (laser printer controller) board with the TMS34010 and the AT clone with the INTEL 86 family) should be taken. On the LPC board and the host AT clone, the communication is taken care of by 8578 and Port 1 interrupt service routine, respectively.

3. Since SSD (software system debugger) is intended to be intelligent, there is a need to define Escape Command Sequences for which the windowing operations can then be possible. These command sequences are issued from LPC to request AT clone (Smart Terminal Emulator—STE) to do some specific operation.

4. Since both Debugger Control Emulation (DCE) software and the target software are using the same hardware environment, conflict is inevitable. The DCE and the target used the same hardware interrupt vector table, as shown in FIG. 4. The hardware interrupt vector addresses are between 0x3FFFFC00 and 0x3FFFFFFF, which are located in the ROM portion of DCE. At one time, either the DCE or the target software can access the hardware table. DCE must provide a way for the target program to be able to access the vectors.

Therefore, a software vector table is used in this case, where the DCE can map the hardware and software vector tables. Whenever an interrupt occurs, it "double jumps" before it goes to the interrupt service routine, first to hardware table and then to software table, as seen below:

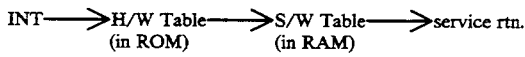

The software vector is located in RAM (see hardware vector table of FIG. 4). This is transparent to the target so the target can define any vector interrupt in the hardware vector table. The vector for "illegal opcode" (TRAP 30) and the vector used for break points are reserved for debugger.

5. DCE and target software share the same memory (RAM), but do not share the same piece of STACK (ST). The DCE and the target have different ST. Each time the target program is being loaded, DCE finds out its Stack Pointer (SP) and initializes the contents of the target stack, so that DCE can recover control when target program is normally ended.

The debugger is composed of two independent parts of software, the Debugger Control Emulation (DCE) and the Smart Terminal Emulator (STE). The DCE is the part that actually does most of the work. It resides in the LPC (laser printer controller) board as ROM. The DCE is chosen as the main part of the debugger because of the speed of the TMS34010 (40 or 50 MHz) compared to the AT clone 286 or 386. Another reason is that the TMS34010 facilitates the execution of the target by actually using the TMS34010 to execute every single target instruction.

The STE complements the debugger by serving as an input/output peripheral. The host (AT clone) is taken as STE, since it obeys the escape commands sent by the DCE. Mainly, these escape commands are used to control the display on the screen. The STE sends debugger commands and data requested by the user, to DCE.

Since each part resides in two different environments, a synchronization strategy is required to make these two parts work together. These two parts communicate with each other through serial communication. In order to have a reliable and efficient communication, each part receives information by the interrupt method.

The debugger can be pictured with the following main functions: initialization, loading, execution, displaying and modification. Based on these functions, a more specific debugger task is explained in the following sections. Some flow charts are shown to facilitate the understanding of the design.

FIG. 5 depicts the debugger system diagram. The hardware connected to the debugger is initialized in the LPC board, which includes a serial device. The software initialization includes both DCE (LPC) and STE (AT clone). In both DCE and STE the debugger receive/transmit buffers are set up. On the STE side, the serial port and its service interrupt routine are initialized. On the DCE side, the debugger software table is set. After this initialization, the information window (user interface) is displayed on the screen. At this time, the debugger is ready to accept commands.

There are two main things that have to be set up before read/write any data to RAM in the LPC board. This has to be done even before the C_INT00 routine (see page 3-13 TMS34010 C Compiler): 1) The refresh mode type is done by setting a one in the 2nd bit of the I/O controller register (C000,00B0), see page 6-11 (TMS34010 user's guide 1988); 2) According to the power up condition, there should be a delay of at least 8 RAS cycles before writing or reading to memory (see errata sheet for the TMS34010). After these conditions are set, the C_INT00 can be executed as below.

start: set refresh mode type;
power-up delay;
jump to C_INT00;

Note the C_INT00 is a TMS routine. The work done by the C_INT00 routine is not related to the execution of the debugger.

Figure 6:
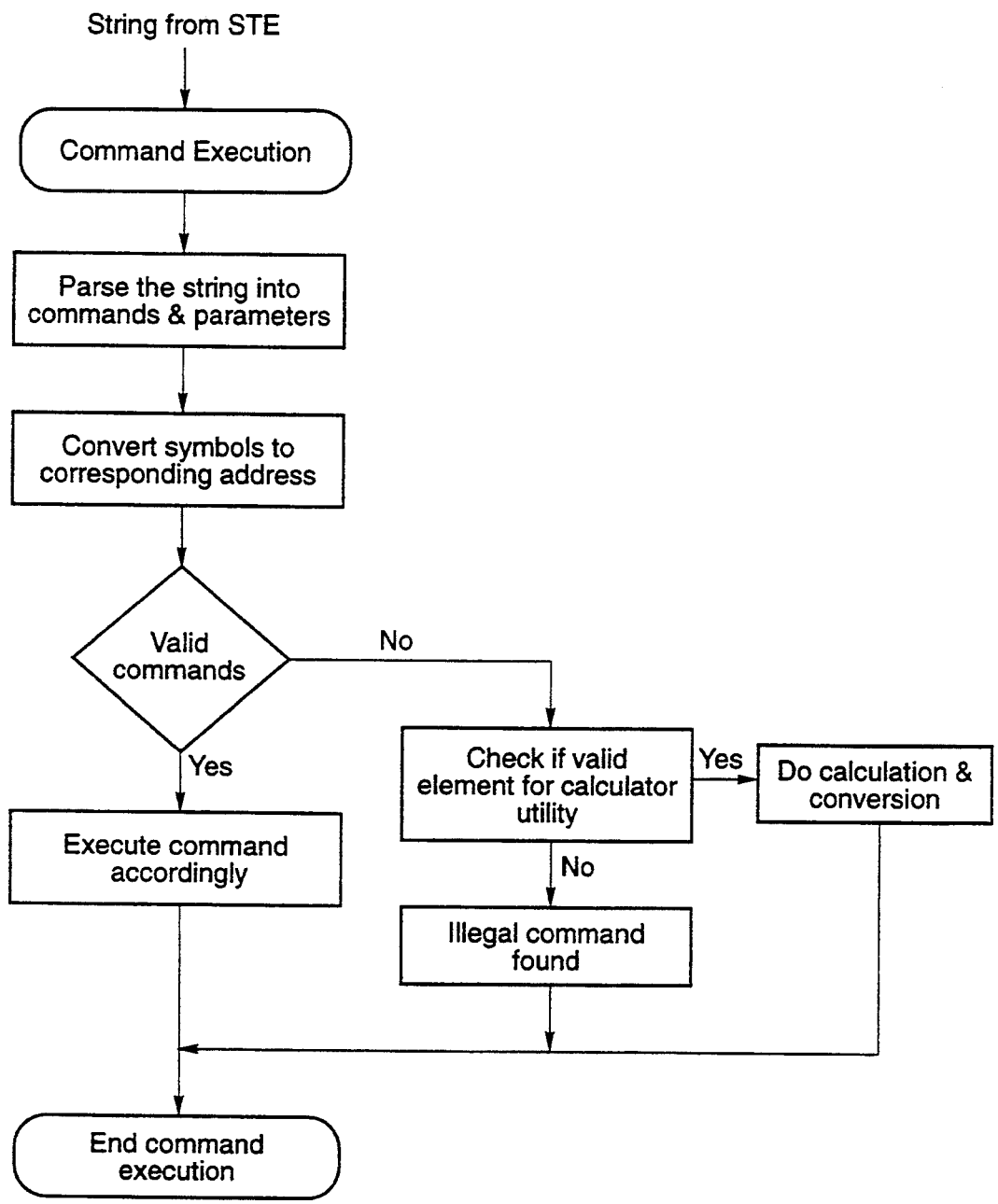
FIG. 6 depicts how a debugger control emulation (DCE) executes commands from a smart terminal emulator (STE).

Debugger Initialization (FIG. 6)

Initially, the steps to follow for control flow are not necessarily the same all the time. This diversity is caused by the two different software environments (TMS and AT clone). Initially, one can start without the other. That is, the AT clone or LPC can be powered up at any time. (See FIG. 6)

If the LPC is powered up first, the DCE doesn't have to know if the AT clone (STE) is powered up or down. It simply does its work assuming STE is ready. DCE can still run even if the AT clone is powered down (STE not running). But the DCE can't do much if there are no input commands from the STE.

Similarly, if the AT clone is powered up (STE running), the STE does not have to know if LPC is powered up or down (DCE running). After initialization, STE sends its log in command and then waits for information from the LPC (data and escape commands) or the keyboard (user). The STE can still run even if the LPC is powered down (DCE not running). But the STE can't do much if there is no input from the LPC (DCE).

Most of the time these two environments are independent of each other. But there are some times when software handshaking (synchronization) is necessary in order to complete certain tasks. In this particular case, time and effort should be considered, especially on the AT clone side.

Once both parts are initialized and ready, the DCE waits to execute commands sent by the STE. In the meantime, the STE checks for the following: errors caused by serial communication; keyboard input; data processing (escape command and data display).

FIG. 6—Command Execution

Based on these two different software environments, the DCE (LPC) is the one that does most of the work once it receives the command from STE. The STE receives the string (command) from the keyboard and sends it to DCE. Then the string is parsed to have command and parameters (if any) as in the C programs that expect commands and parameters. The first argument on the string is the command, the rest of the arguments are its parameters. Up to nine arguments can be expected. For each valid command there should be at least one command word (e.g., "load"). (See FIG. 6)

Once the command is parsed, the symbols entered in that command are converted to its corresponding address. This is necessary because DCE works at the address level. Finally, the command is checked to see if it is a valid command. If it is a valid command, then it is executed accordingly. If it is not a valid command, then the parsed string is taken as legal elements for the utility calculator (to be explained later). If it is not a legal element, the command is taken as an illegal command.

The utility calculator takes one or two numbers in hexadecimal or decimal value. These numbers are automatically computed and converted to hex, decimal or octal. The arithmetic operators (+, −, * and /) are used in the computation. The command validation takes priority over the calculator. Any argument entered that is valid for both calculator and command is valid in the command level only.

Figure 7:
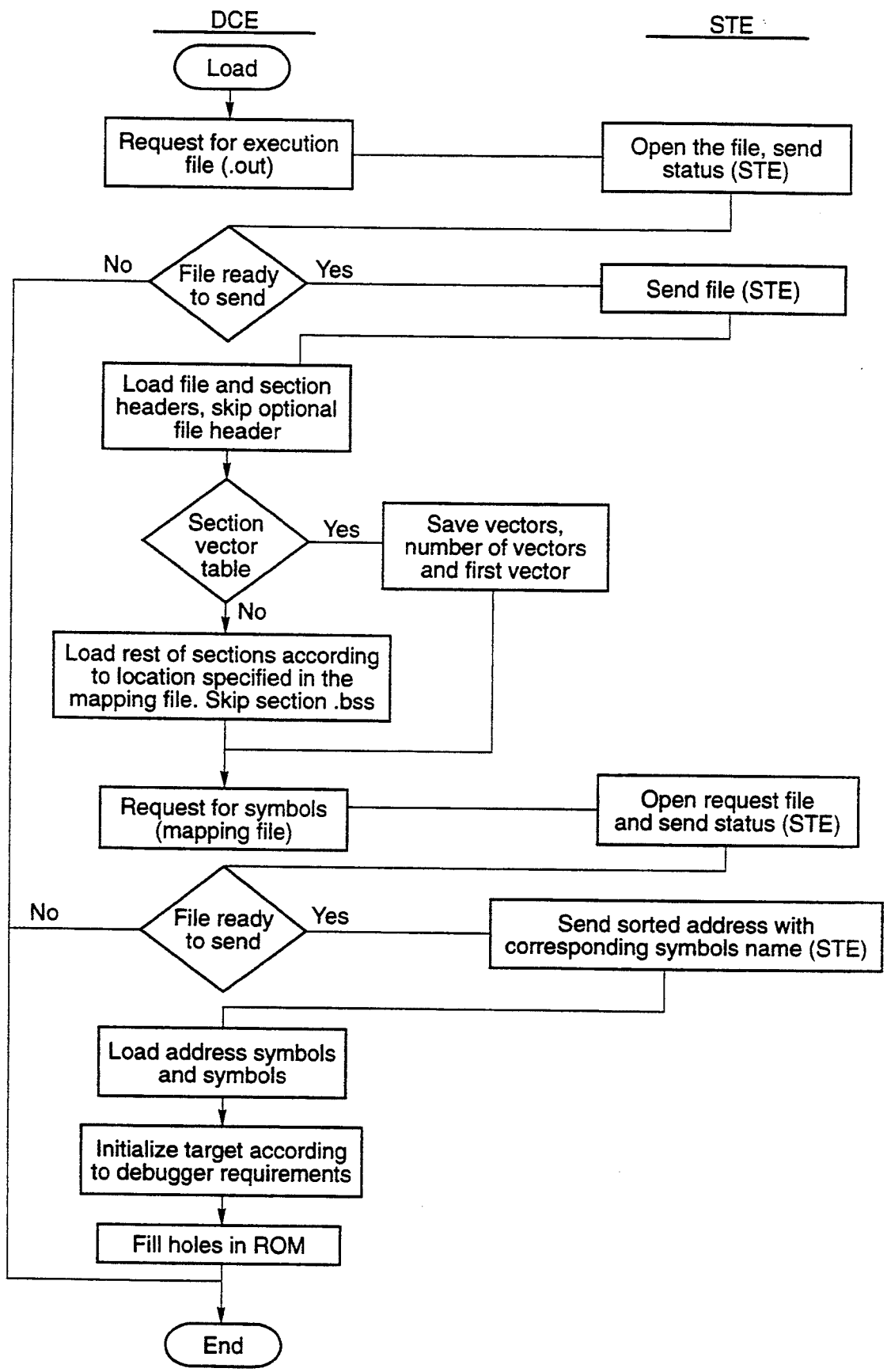
FIG. 7 shows how target software is loaded in the debugging system.

FIG. 7—Loading the Target Software

Loading a target program to the LPC board is one of the main functions the debugger has to accomplish. It has to load the executable and map target files, and has to initialize the target.

In order to do these, the DCE works interactively with the STE making sure target program is loaded successfully. Once the DCE receives the load command, the DCE makes sure the STE opens the requested target file. If there are any problems, the loading process terminates. Otherwise, the file header, the optional file header and the section header are loaded in the sequence (See Appendix A—TMS34010 Assembly Language Tools). Because the optional file header is not used, the data is ignored in DCE when loading this header.

The file and section header have all the information about the target programs (executable object file). From this information, the number of sections are loaded to RAM in the particular location specified in the target mapping file (at link time).

All sections are loaded except for section ".bss" (the variables) and the interrupt vectors section (3FFF,FC00 to 3FFF,FFF0). Note in the vector section the debugger hardware vectors are resident in ROM. Instead, the number of target vectors, the first vector location and target vectors are saved. This information is needed in the execution part when the target vector table is swapped. (See Setting Up Target Execution section.)

After loading the sections, the symbols (from the .map file) are loaded in a similar way. A symbol table is created with the symbol name and its corresponding address. The DCE makes sure the STE is ready to send the requested target mapping file. If there is any problem, the loading process terminates. Otherwise, the addresses and their corresponding symbols are loaded.

Another task of loading the target software is to initialize the target according to debugger requirements. The target stack and the auxiliary stack are initialized according to the pointers found in the C_INT00 routine. The stack of the target software is adjusted so that control is passed back to debugger when the last target instruction (RETI) is executed. That is the debugger status and the location (address where control is returned after the target terminates normally) are saved as the first elements of the target stack. The target program counter, status and registers are initialized accordingly.

All unused memory space defined in ROM are filled with OxFF so that checksum works. Finally, the target information is displayed, see target information section.

Figure 8:
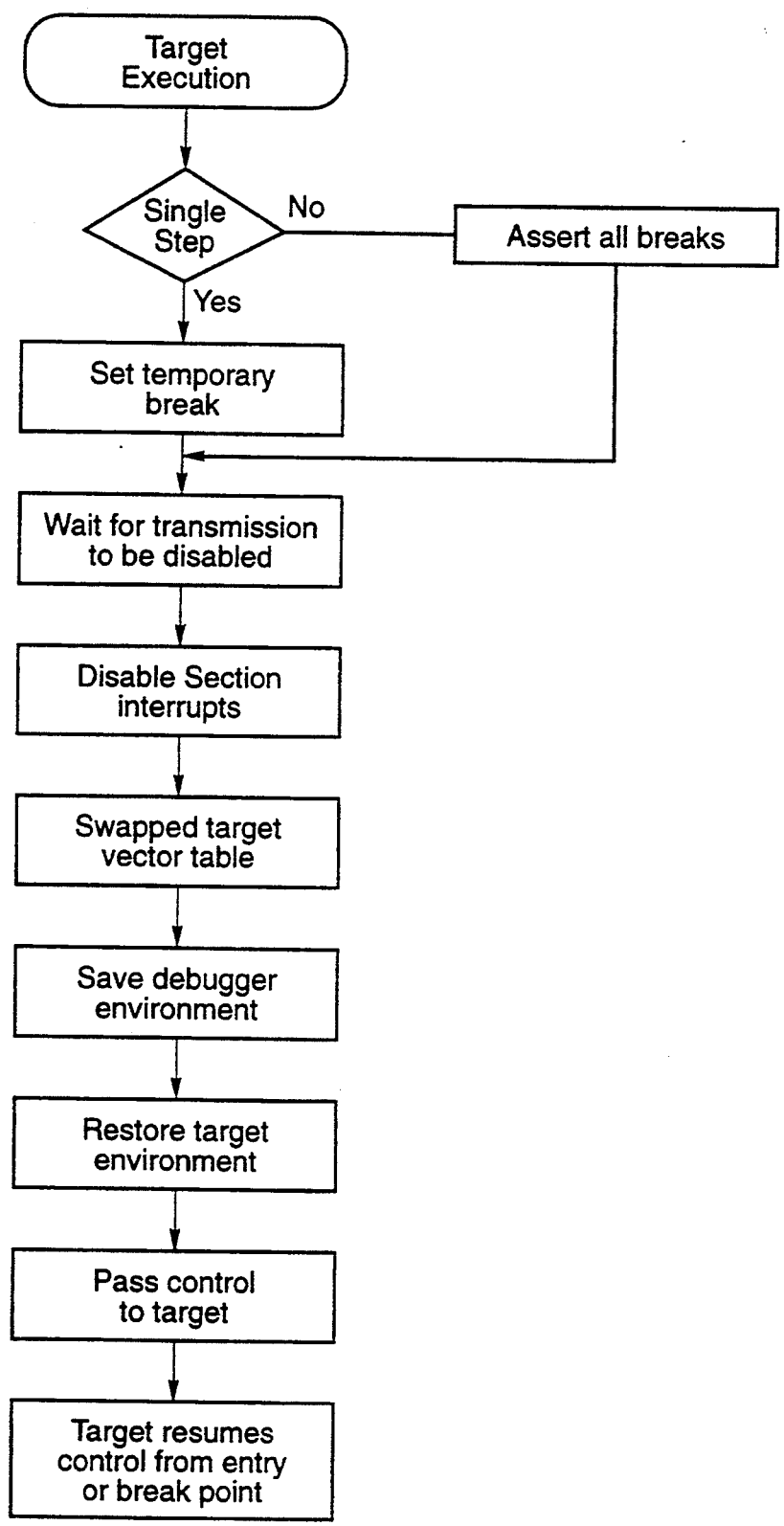
FIG. 8 shows the process of setting up target programs for execution.

FIG. 8—Setting Up Target Execution

The execution of the target is the most critical task for the debugger. This execution can be done in two ways: SINGLE STEP (SS) and GO. SS executes one instruction at a time from the current target program counter. GO executes the code from the current target program until the end of the program or until it hits a break point. The main idea, as mentioned earlier, is to let the TMS34010 execute each single target instruction at real time. In order to do this, the debugger has to be able to pass control to the target and to recover control from the target.

This task is divided into three parts: 1) target set-up, 2) control recovered from break point and 3) control recovered from target normal end.

Target is set for SINGLE STEP or GO execution. Target execution starts by asserting all break points (if any) when GO is invoked. Otherwise, a temporary break is set for SS. If GO is invoked, DCE acknowledges GO to STE, but it does not acknowledge SINGLE STEP. Before disabling the system interrupts, the debugger waits for transmit to finish. This is necessary because the target and the debugger are sharing the same serial communication channel.

Next, the transfer of control to target takes place. There is a critical period from this point until control is passed to the target. There should not be any interrupt while the vector table is swapped; the debugger environment is saved; and the target environment is restored (the target or debugger environment refers to all general purpose and some I/O registers, including PC, ST and SP).

Vector table is exchanged from DCE to the target software. This allows the same serial line to be used by the target software.

At this time, the target is ready to start or resume control of the system. Once the target gets control of the system, it is the responsibility of the target that everything goes well in the system. In the meantime, the debugger waits for two things to occur: 1) for the target to hit a break point (TRAP); 2) for the target to execute an illegal command (Trap 30). In the last case, the debugger starts all over from the beginning, and the target program is lost.

GO mode is the special case when the target program and STE (AT clone) communicate to each other via the same serial channel. This happens after the GO command is invoked (debugger passes control to the target). It happens this way because the same 8578 can be used by the target to communicate with the STE (AT clone). The AT clone input/output is handled by the STE, so at this mode the STE has to be able to send data files to the target program.

Figure 9:
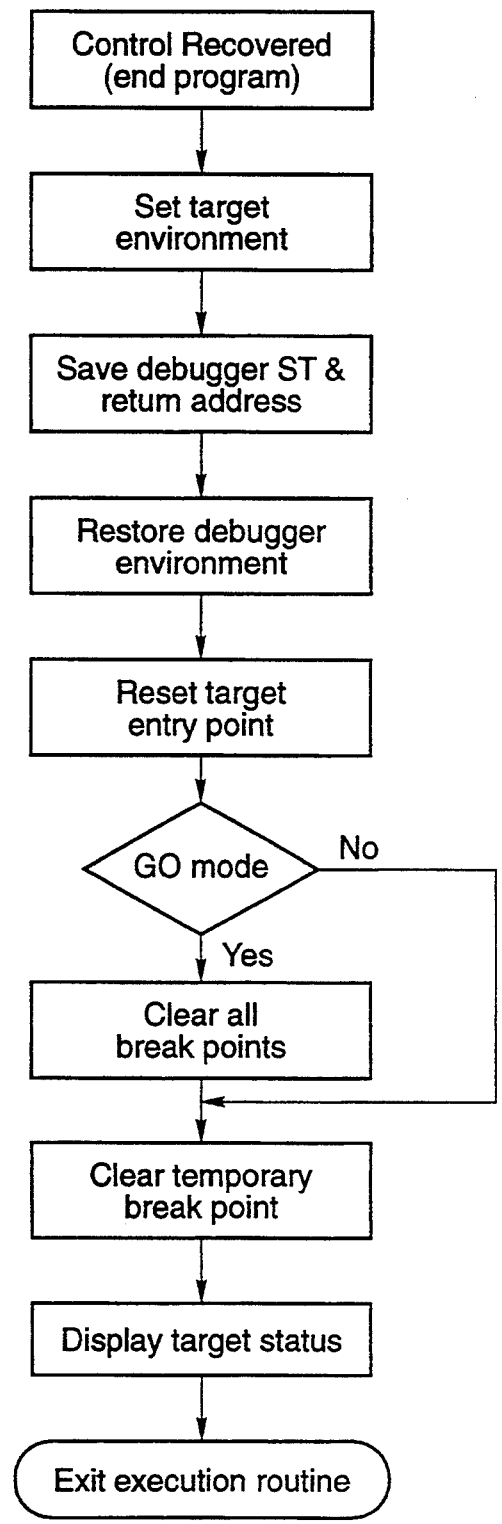
FIG. 9 shows the process of recovering from the end of executing the target program to DCE.

FIG. 9—Recovering From End of Target

After a target program ends normally, the target execution environment is set and the debugger environment is restored. This allows the repeated execution of the target program.

Debugger gets control back after a target program ends normally. The last instruction in the executable file is always RETI, which is a return from an interrupt. Therefore, the last two elements saved in the target stack should be the "debugger status" and the specified address where the debugger is able to recover from this situation (see FIG. 9).

These two elements are saved when the target is loaded (see loading target section). So this portion is responsible for setting the target environment in a similar way when the target was loaded. Also, the target stack is adjusted after the two elements (mentioned above) are pushed in the stack.

Next, the debugger environment is restored and the target vector control table is swapped. At this point, the debugger gets complete control back and the target entry point is reset. If GO mode is on, all break points are clear. Otherwise, temporary break points are cleared. Finally, the target information is displayed.

Figure 10:
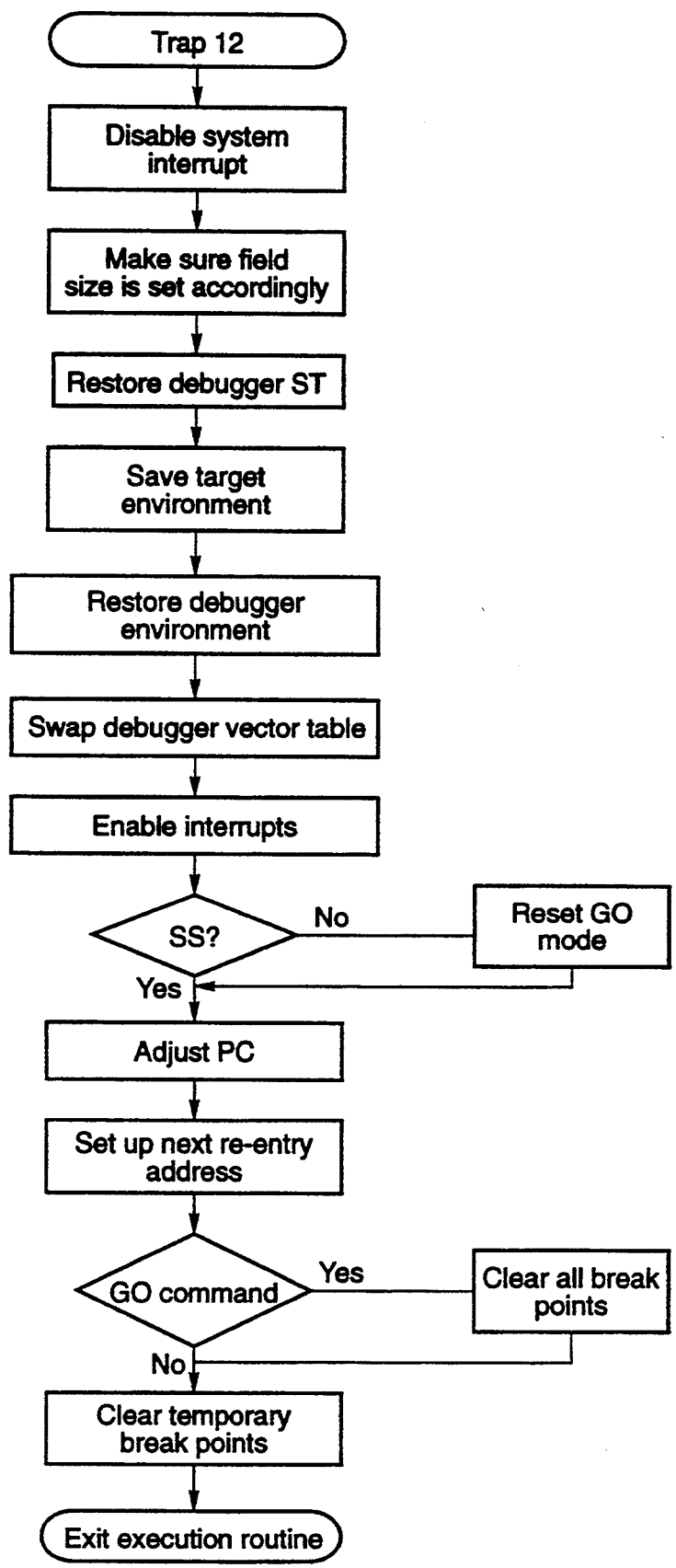
FIG. 10 shows the process of recovering from break point to DCE.

FIG. 10—Recovering From Break Point

The debugger gets control back after a break point is encountered in the target program. For all these break points, the same TRAP (e.g. TRAP 12) is used, which is the same as the temporary break for single step. This portion is responsible for getting control back to the debugger without any target information loss.

Therefore, there should not be any interrupts at this time, so the system interrupt should be disabled. Any data pending in serial communication for the target is lost. This is one of the limitations, because the same serial communication channel is used. The field size is set according to the debugger needs. The debugger status is restored. The target and debugger environment is saved and restored, respectively. The debugger vectors table is swapped, and the system interrupt is enabled. At this point, the debugger gets control back.

If GO was entered, then the GO mode is reset. The program counter is adjusted since the last instruction executed was a trap (one word instruction). The next entry target address is set-up. This is the address of the next target instruction that is going to be executed. Finally, if GO was entered, then all breaks are clear; otherwise, the temporary break(s) is cleared.

Transmit/Receive Data

This I/O data is handled by the 8578 which is programmed as a serial communication device with the interrupt method. All receive/transmit data is saved in a circular receive/transmit buffer, respectively. These are the debugger buffers, which should not be confused with the transmit/receive buffer of the 8578. This applies to DCE and STE.

Breaking Concept

Break points is the way to break from the target. Once the target gets control of the system (LPC), the break points are used to stop the target from execution at the specified location. The break points are trap instructions set in the target program. The same trap is intended to be used for all break points.

Asserting Break Points

The break points are asserted before passing control to target. This is done when GO is invoked. For each breakpoint declared at the specified location, the TRAP instruction is inserted. Before inserting the trap, the opcode of the instruction is saved, so it can be recovered later when all break points are cleared.

Temporary Break Points

This is a special break point that is used in single step. Since in SS only one instruction is executed at a time, a temporary trap is inserted right after that instruction. This is the case for most of the instructions, except for the branch and return instruction. For the branch instruction (ex. CALL, JUMP, DSJS, EXGPC, JAEC, JRCC), a special care is taken according to their condition. For instance, in the conditional Jumps two traps are inserted, one for each possible case.

One of the keys to insert temporary break points is by finding the size of the instruction to be executed. This way, the debugger knows where to set the trap without contaminating the target code. Note, temporary breaks are only for single step (see Setting Up Target Execution section).

Clearing break points

The break points are cleared by removing the traps from the target. This is done by restoring the opcode to the location where the trap was inserted. This hold for all the traps inserted in the target. Note that all traps are cleared after execution of the target (after each normal and temporary break).

Figure 11:
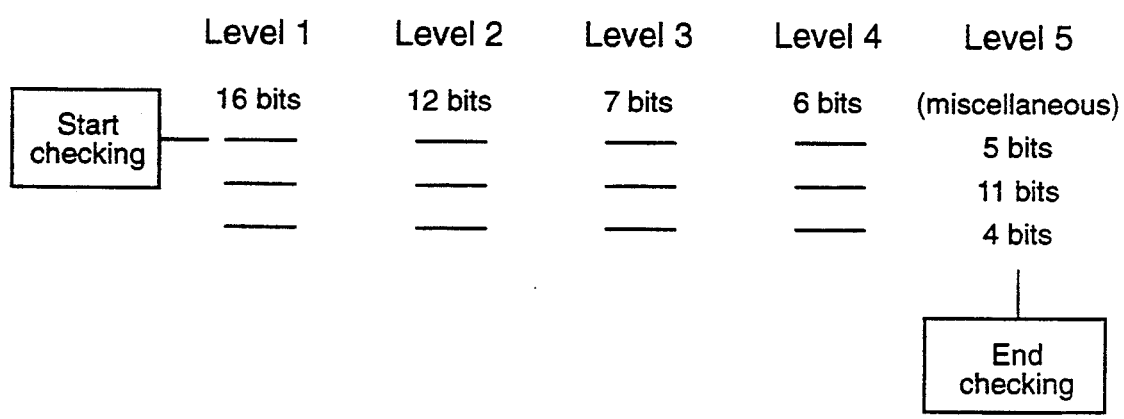
FIG. 11 shows disassemble levels.
Figure 12:
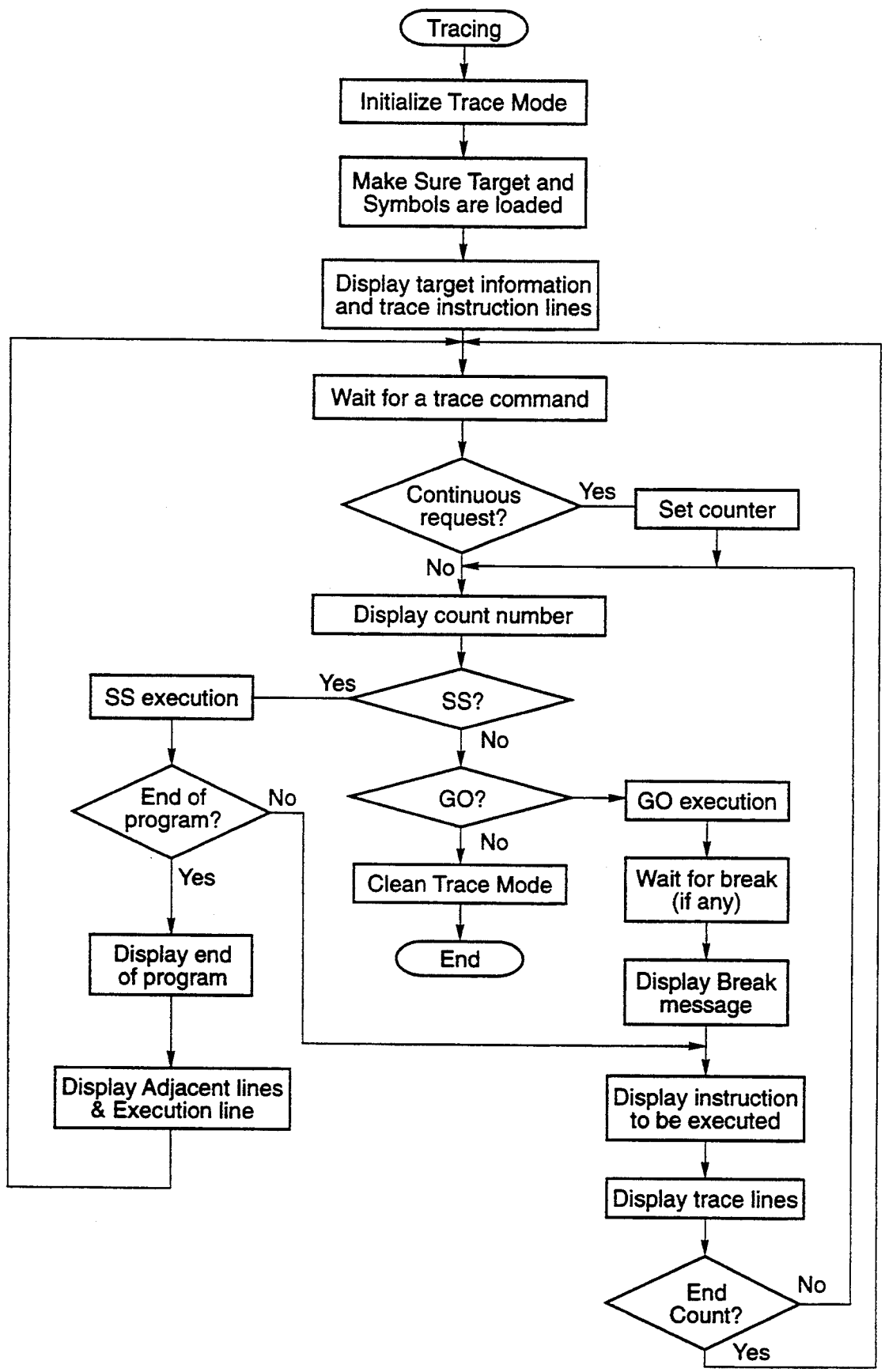
FIG. 12 shows the tracing of the target program.

FIG. 11—Disassembling Code

The only two pieces (sources) of information about the target are the executable (.out) and the mapping (.map) files. From these two files, the target assembly code is displayed. In order to to do this, the target executable file is disassembled by reading the code and transforming it back to assembly code representation. Also, the symbols are displayed instead of the corresponding addresses. This is done one assembly instruction at a time.

In order to disassemble the code, a special method is designed so that disassembly is efficient and reliable. The method consists of various levels. These levels are set according to the TMS34010's instruction opcode (bit size) difference. The opcodes are categorized into five bit group sizes. Each group can be put into a different level when looking for the specified opcode. The TMS34010's opcodes are broken into five different levels. The levels 1, 2, 3, 4, 5 consist of 16, 12, 7, 6 and miscellaneous bits, respectively.

Given the address and the opcode, the completed instruction can be disassembled and displayed symbolically.

The numbers are displayed in hexadecimal numbers. Once an opcode is found, level checking stops. If the opcode is not found, it is taken as an illegal opcode.

If the instruction opcode is found, the rest of the information for that instruction can be figured out. Another important thing is to find the size of the instruction. This is very helpful if only the instruction size is needed. With these levels, there are subgroups that are categorized according to their similarities, which vary from level to level.

FIG. 12—Tracing

Tracing is another way to execute the target. The basic way of executing the code is the same as the GO and SS, but this time the instruction lines are displayed with the rest of the target information. The trace instruction lines are the instructions to be executed and its adjacent lines. The instruction to be executed is distinguished (i.e., highlighted when displayed). At this mode, only the execution commands: SINGLE STEP, GO and Skip Subroutine (SD) are valid.

Two other trace commands are added here: 1) Continuous Execution and 2) Continuous Execution but Skip Subroutine.

Continuous Execution executes sequential single steps for the number of single step counts specified. The single step count is set before trace mode. The next trace command is the same as Continuation Execution, but this time the subroutines are skipped. In the GO command, instructions are displayed after the break point (if any). In other words, the instructions between GO command and break points are not displayed.

The trace mode starts by initializing and making sure the target and its symbols are loaded. At initialization, both DCE and STE are set up to work specifically for this mode. The target information and trace instructions are displayed. After this, the debugger waits for a trace command.

If SS is specified, then continuous execution and displaying is done until the end of instruction counter or end of program. If GO is specified, then the display doesn't change between this request and the break point (if any) or end of program. After end of program or break, the mode continues normally. In GO command, the debugger changes to "GO Mode."

One of the debugger's main concerns is to be able to display as much information as possible from the target execution. Primarily the general register, Special Register (PC, SP, ST), flags and stack content are displayed. This information is saved and displayed most of the time. The flags are displayed by figuring out the information in the target status register. The stack content is displayed by reading the stack content.

This information is updated and displayed every time target execution (SS, GO) is requested. Also, the target command names are displayed.

Registers Handling

The debugger is responsible for displaying or modifying the specified registers. The registers are the General Registers (files A and B) and the Special Registers (PC, ST, SP). Even though these registers are displayed instantly at target execution, they can be individually displayed and/or modified at any time. Since target and debugger share the same hardware in the LPC board, the target and debugger register information is saved in memory.

General Register

The General Register includes Register files A and B. When requesting to display or modify registers, the first thing checked is the register number. If the register is to be displayed or modified, then find if Register A or B and display or modify it, respectively.

Special Register

The Special Registers are the Status (ST), Program Counter (PC) and Stack Pointer (SP). These special registers are handled in the same way as the General Registers. They can be modified or displayed. If display is requested, then the debugger reads the specific target register information from memory (where this information is saved) and displays it. If modify is requested, then the content of the specified target register is changed and displayed accordingly.

Memory Handling

Memory can be displayed, filled or modified in bytes or double words at the specified location. This process is done by reading or writing directly to the specified location(s).

Displaying Memory

The content of the specified memory locations is read and displayed. In order to display this memory, the length, type (Byte, Word, Double Words) and location are checked. If this information is given correctly, the data is displayed accordingly. If the location is not specified, the debugger displays data from location (address) Zero or from the last memory display location.

Modifying Memory

The content of the specified memory locations can be modified. In order to modify this memory, the type (byte, word, double word) and location address are checked. The present data at the first location is displayed, then the debugger waits for input. If the user requests modification, then memory is changed and the next location is displayed. This continues until the user requests to exit memory modification.

Filling Memory

Filling memory is similar to modifying memory. It changes the contents of the specified locations. The difference is that filling can change more than one location at a time with a specified pattern. Given this information correctly, the debugger modifies (fills) the specified locations with the given pattern.

Figure 13:
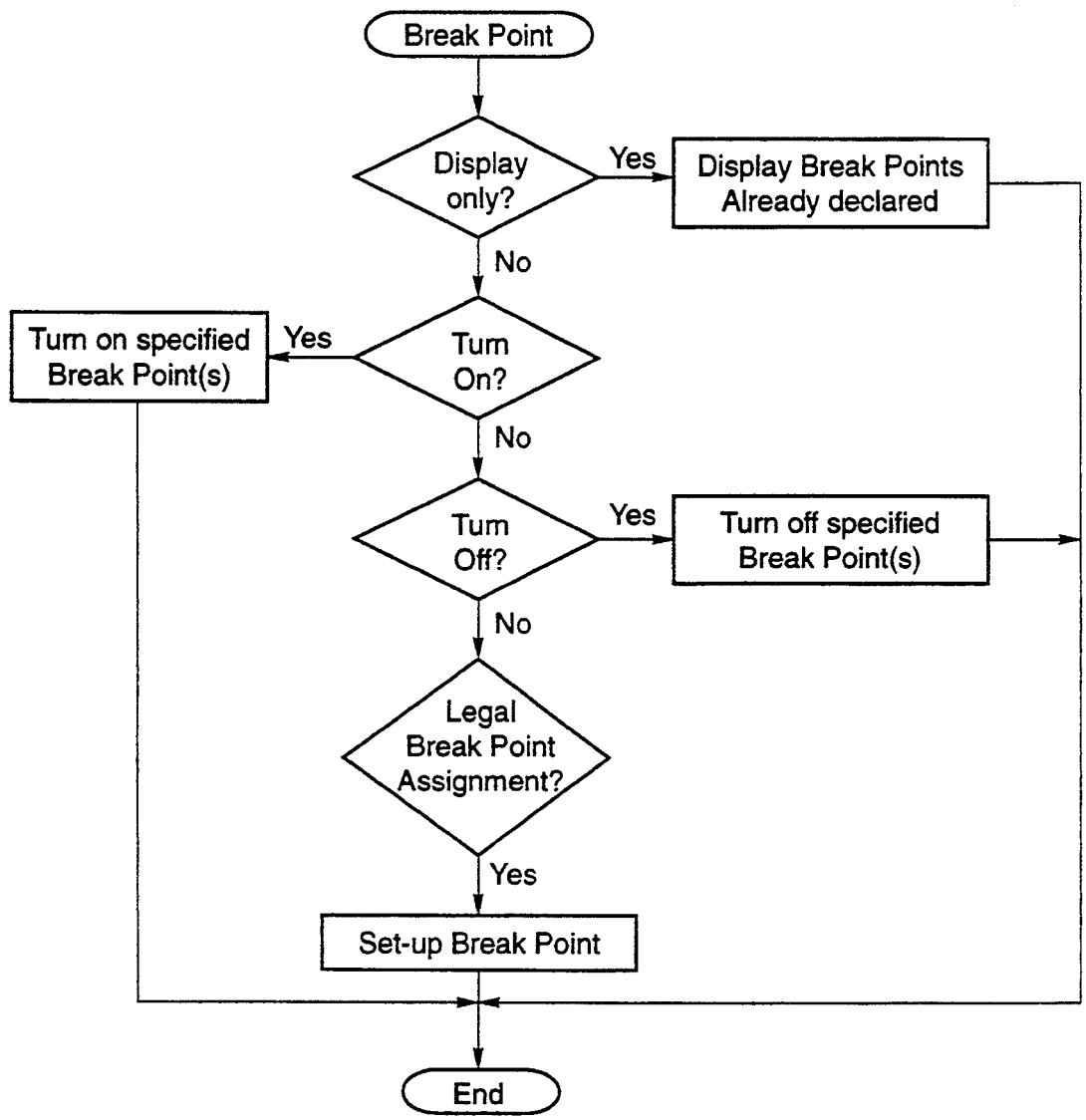
FIG. 13 shows breakpoint manipulation.

FIG. 13—Break Points

The user's request for declaring or clearing break points are explained in this section. Note that declared break points are valid only when GO is invoked.

Break points are declared at the location specified by the user. Once the break point is declared, it can be turned on/off or displayed. One or all of the specified break points are turned on/off by user request. If a request is to declare a new break point, then a new break point number is assigned. If all available break point numbers have been assigned or the specified break number doesn't exist, then break point assignment fails. Otherwise, the break point is declared and displayed.

Clearing Break Points

The break point is cleared. These break points will not be effective at execution time. All or only one specified break point can be cleared. Once the break point is cleared, they can not be displayed.

Debugger Utilities

Debugger utilities are some of the other features that enhance the debugger. Some of these utilities correspond to previous features.

Addressing

The debugger displays the address of the corresponding symbol. If the symbol name is given, it is checked in the symbol table. If the symbol exists, the symbol and its corresponding address are displayed. If the symbol is not found, a message is displayed.

Target Reset

The target program is reset. The target is set up the same way when it was loaded (see Loading the Target Software section).

Symbol Display

The target symbols and their corresponding addresses are displayed. This is done by reading the symbol table. Symbol display can be started in two ways: 1) by displaying all symbols starting from the first one, and 2) by having a wildcard expression which specifies certain groups of symbols.

Before starting display symbols, the debugger makes sure symbols are loaded. If symbols are not loaded, the request is terminated. If symbols are loaded, the wildcard (if any) is prepared. The symbols are displayed accordingly. At the same time the symbols are displayed, the number of symbols displayed are checked. If the number of specified symbols is completed, then debugger stops and waits for user response. At this point, the user can continue displaying symbols or terminate this request.

Screen Set-Up

The number of lines displayed on the whole screen can be set up. If screen is requested without a specific number, the current screen set-up is displayed. Otherwise, the screen is set up according to the specified number.

Batch File Creation

A batch file is created with the number of commands specified. This batch file is a standard text file which can be modified with a standard text editor. If no file is named, the debugger will ask for it. If there are problems creating this file, the batch creation terminates. Otherwise, the batch editor is entered. This a one quick line editor mode. Input from the keyboard is expected. At this mode, the user can type or hit a control key. Only one debugger command per line is allowed. If there is any error written to the batch file, the debugger displays an error message and terminates batch creation.

The main concern for this file creation is to have a CRE-LF (carriage return—line feed) at the end of each debugger command. Control Z (Z) is the last control character in that batch file. This also is an indication to exit batch creation.

Batch File Execution

The commands in the batch file are executed. This file can be a batch file created by the debugger or a standard text editor. One debugger command per line is expected. If a file name is not given, the debugger will ask for it. If there are any problems opening this file, an error message is displayed and batching terminates. Otherwise, the batch file is read and commands are executed.

Control characters are ignored except for TAB and CR. TAB characters are replaced with a space. Each debugger command line should have a CR at the end. This indicates end of debugger command in the batch file.

Displaying Files

Text files are displayed. The specified file is opened. If there is any problem opening the file, an error message is displayed. Otherwise, the file is read and its data is displayed. This is similar to "TYPE" MS-DOS command.

Printing Data

Data sent from the LPC board to the screen for displaying can also be sent to the printer. Printer can be set on/off (default is off). At user's request, this status information (printing on/off) can be displayed any time. If user requests printing on, then all data sent to the screen is sent to the printer too. Data is sent to the printer until printing is set off. User can send data to the printer at any time. After user requests printing off, any data in the printer is flushed (see Sending Form Feed section).

Help Display

Help utility displays the debugger command information. Help can be invoked like any other command. When help is requested, the current screen information is saved, and the "Main Help" menu is displayed. At this point, the debugger waits for key input. If exit is requested, then help information is terminated.

If command information is selected, the "Main Menu" screen is saved, and the information for the selected command is displayed. At this point, the debugger waits for key input. After key response, the main menu is displayed. If request is to continue, the process continues as before, when the main menu was displayed. If request is to exit, then the help information is terminated. After the help is terminated, the previous screen information (before help main menu was displayed) is displayed back.

Repeat Last Command

The last debugger command entered can be repeated. This is done by displaying the command at the current prompt. The current prompt can be the debugger command prompt or the GO mode prompt. Note, this is similar to control key F3 in the MS-DOS.

Sending Form Feed (FF)

A form feed (FF) control character is sent to the printer. This is valid only if printing is on (see Printing Data section). Consequently, the data (if any) in the printing buffer is flushed. Note that a page is printed only if the page is filled or an FF is sent.

Skip Subroutine

Skip subroutine is in single step. When this condition is requested in single step, a temporary break (TRAP) is inserted after the subroutine call (CALL) instruction.

Set Single Step Counter

The single step counter is set for trace mode only. The user can specify the number of continuous single steps executed. If the specified count number is not given, then the current single step counter number is displayed.

The foregoing description of the preferred embodiment of the invention has been presented for purposes of illustration and description. It is not intended to be exhaustive or to limit the invention to the precise form disclosed, and many modifications and variations are possible in light of the above teaching. The preferred embodiment was chosen and described in order to best explain the principles of the invention and its practical applications to thereby enable others skilled in the art to best utilize the invention with various embodiments and with various modifications as are suited to the particular use contemplated. It is intended that the scope of the invention be defined only by the claims appended hereto.

What is claimed is:

1. A system for debugging an application program, said system comprising a host processor unit and a debugging execution unit operated under an operating-system-free environment, said debugging execution unit including:
    a target processor unit for executing said application program and for executing a first debugging program to debug said application program being executed by said target processor unit;
    a communication channel for transmitting communications between said host processor unit and said target processor unit;
    communication port circuitry that generates interrupt signals during execution of said application program and during execution of said first debugging program, said communication port circuitry coupled to said communication channel and said target processor unit;
    said first debugging program including a first set of input/output procedures for execution by said target processor unit for handling debugging communications over said communication channel;
    said application program including a second set of input/output procedures for execution by said target processor unit for handling communications over said communication channel, said communications comprising communications associated with execution of said application program; and
    interrupt vector mapping means including:
        (a) a first interrupt vector map having a first set of interrupt vector entries for mapping said interrupt signals to a first set of destination addresses; said first set of destination addresses including addresses corresponding to said first set of input/output procedures;
        (b) a second interrupt vector map having a second set of interrupt vector entries for mapping said interrupt signals to a second set of destination addresses; said second set of destination addresses including addresses corresponding to said second set of input/output procedures; and
        (c) control means for controlling mapping of interrupt signals using said first and second interrupt vector maps such that
            i) said interrupt vector mapping means maps said interrupt signals via said first interrupt vector map during execution of said first debugging program; and
            ii) said interrupt vector mapping means maps said interrupt signals via said second interrupt vector map during execution of said application program.

2. The system of claim 1, wherein
    said first set of interrupt vector entries link said interrupt signals to a first set of memory locations that contain said first set of destination addresses; and
    said second set of interrupt vector entries link said interrupt signals to a second set of memory locations that contain said second set of destination addresses.

3. The system as in claim 1, wherein
    said target processor unit is a laser printer controller board; and
    said communication channel is a standardized serial communication channel.

4. The system as in claim 3, wherein
    said first set of input/output procedures are permanently stored in a read only memory device; and
    said second set of input/output procedures are resettably stored in a random access memory.

5. The system as in claim 1 wherein said host processor unit is operated under an operating-system-oriented environment, said host processor unit including a processor for executing a second debugging program to load said application program and send commands and parameters to said target processor unit;
    wherein said application program and first debugging program communicate with said second debugging program through interrupt signals via said communication channel.

6. The system in claim 5, wherein said first debugging program operates independently to perform at least one debugging task, and wherein said first debugging program and second debugging program operate jointly to perform other debugging tasks.

7. The system as in claim 6, wherein
    said first set of input/output procedures are permanently stored in a read only memory device;
    said second set of input/output procedures are resettably stored in a random access memory device; and
    said second debugging program initializes said second interrupt vector map in said random access memory device.

8. A method of debugging an application program in a system comprising a host processor unit coupled to a target processor unit by a communication channel, comprising the steps of:
    transmitting communications between said host processor unit and said target processor unit via said communication channel, and generating interrupt signals when said target processor unit receives communications from said host processor unit;

said target processor unit executing an application program;

said target processor unit executing a first debugging program to debug said application program being executed by said target processor unit, said first debugging program including a first set of input/output procedures for execution by said target processor unit for handling debugging communications over said communication channel;

said application program including a second set of input/output procedures for execution by said target processor unit for handling communications over said communication channel, said communications comprising communications associated with execution of said application program;

storing a first set of interrupt vector entries for mapping said interrupt signals to a first set of destination addresses; said first set of destination addresses including addresses corresponding to said first set of input/output procedures;

storing a second set of interrupt vector entries for mapping said interrupt signals to a second set of destination addresses; said second set of destination addresses including addresses corresponding to said second set of input/output procedures;

mapping said interrupt signals using said first set of interrupt vector entries during execution of said first debugging program, and executing ones of said first set of input/output procedures in response to said interrupt signals generated during execution of said first debugging program; and mapping said interrupt signals using said second set of interrupt vector entries during execution of said application program, and executing ones of said second set of input/output procedures in response to said interrupt signals generated during execution of said application program.

9. The method of claim 8, wherein
said first set of interrupt vector entries link said interrupt signals to a first set of memory locations that contain said first set of destination addresses; and
said second set of interrupt vector entries link said interrupt signals to a second set of memory locations that contain said second set of destination addresses.

10. The method of claim 8, wherein
said first set of input/output procedures are permanently stored in a read only memory; and
said second set of input/output procedures are resettably stored in a random access memory.

11. The method of claim 8,
said host processor unit executing a second debugging program to load said application program and send commands and parameters to said target processor unit;
wherein said application program and first debugging program communicate with said second debugging program through interrupt signals via said communication channel.

12. The method of claim 11, wherein said first debugging program operates independently to perform at least one debugging task, and wherein said first debugging program and second debugging program operate jointly to perform other debugging tasks.

13. The method of claim 12, wherein
said first set of input/output procedures are permanently stored in a first memory device;
said second set of input/output procedures are resettably stored in a second memory device; and
execution of said second debugging program by said host processor unit includes initializing said second set of interrupt vector entries.

* * * * *